(No Model.) 3 Sheets—Sheet 2.
E. J. WOOLF & J. PEEBLES.
VALVE GEAR FOR ENGINES.
No. 407,806. Patented July 30, 1889.
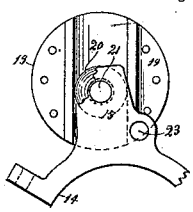
Fig IV.
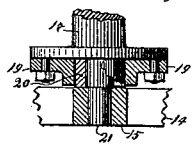
Fig V.
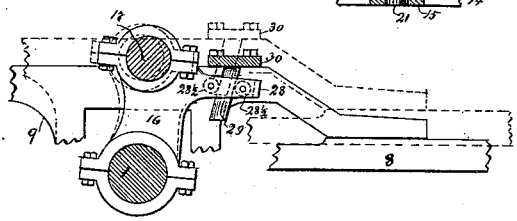
Fig. III.
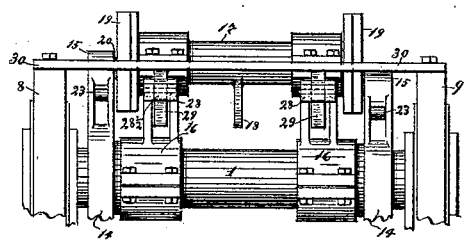
Fig II.
Witnesses
Emma F. Elmore
A. H. Opsahl.
Inventors
Ellis J. Woolf
John Peebles
By their Attorney
Jas. F. Williamson (No Model.) 3 Sheets—Sheet 3.
E. J. WOOLF & J. PEEBLES.
VALVE GEAR FOR ENGINES.
No. 407,806. Patented July 30, 1889.
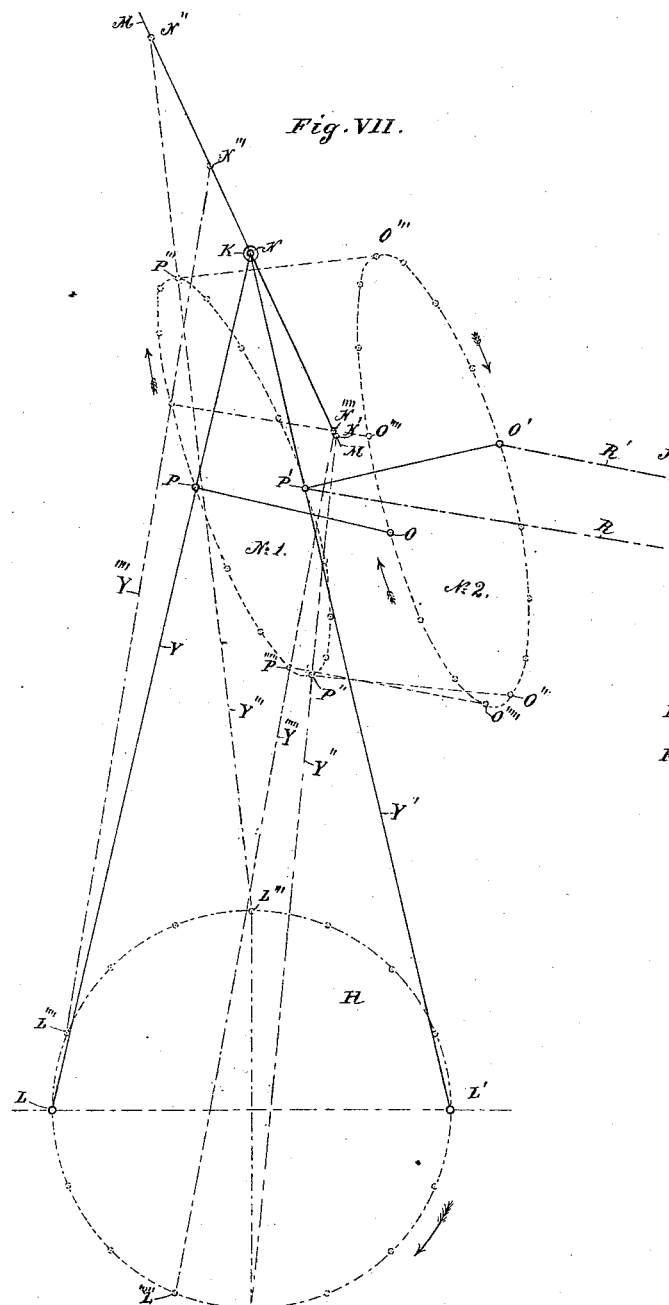
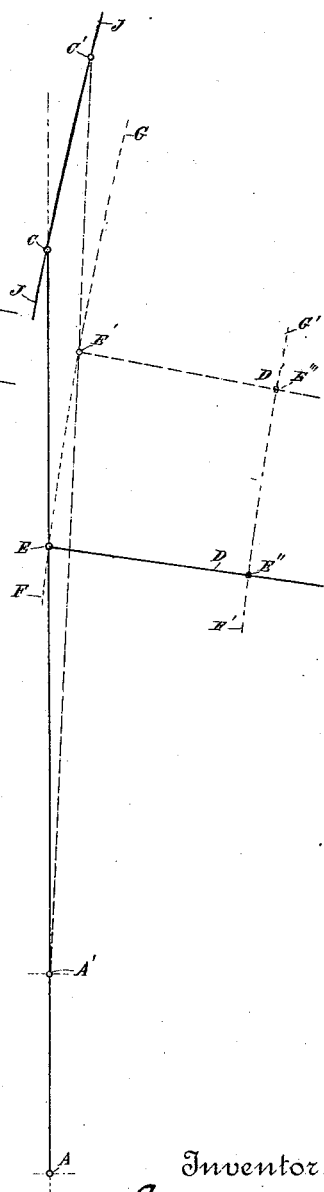
Witnesses
A. H. Opsahl.
Emma F. Elmore
Inventors
Ellis J. Woolf
John Peebles
By their Attorney
Jas. F. Williamson

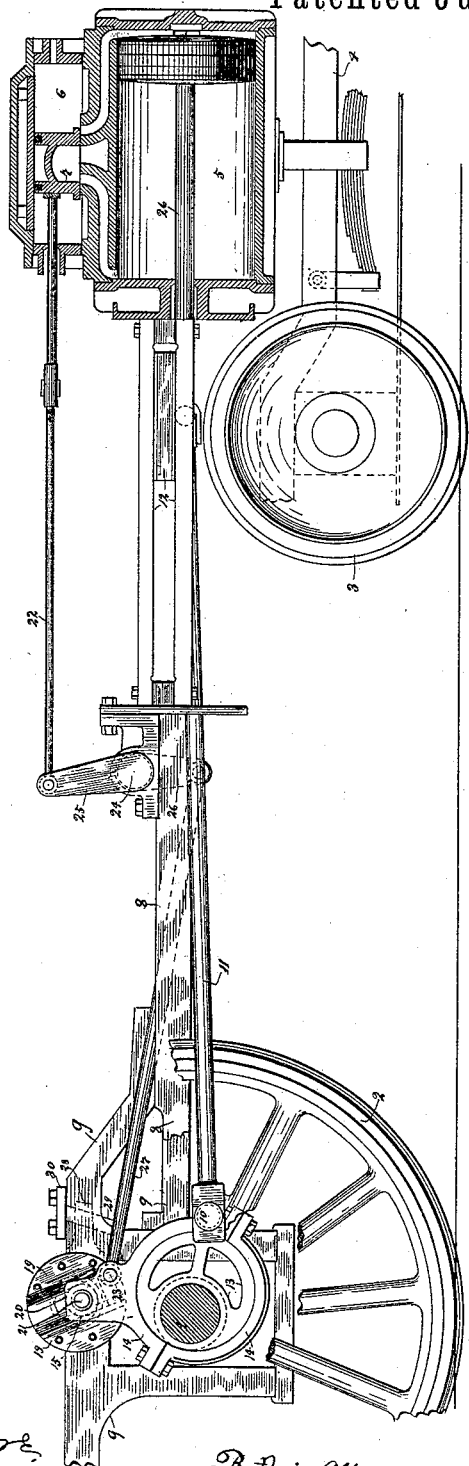

UNITED STATES PATENT OFFICE.

ELLIS J. WOOLF AND JOHN PEEBLES, OF MINNEAPOLIS, MINNESOTA, ASSIGNORS, BY MESNE ASSIGNMENTS, TO THE WOOLF VALVE GEAR COMPANY, OF SAME PLACE.

VALVE-GEAR FOR ENGINES.

SPECIFICATION forming part of Letters Patent No. 407,806, dated July 30, 1889.

Application filed February 25, 1889. Serial No. 301,038. (No model.)

*To all whom it may concern:*

Be it known that we, ELLIS J. WOOLF and JOHN PEEBLES, citizens of the United States, and residents of Minneapolis, county of Hennepin, State of Minnesota, have invented a certain new and useful Improvement in Valve-Gear for Engines, of which the following is a specification, reference being had to the accompanying drawings.

Our invention relates to that class of radial valve-gear in which the amount of lead or advance, variable cut-off, and expansion and reverse action is sought to be obtained from one eccentric, crank, or radial pin to which an arm is attached, having its outer end pivoted in a guide.

The general object of our invention is to obtain the nearest possible approximation to an absolutely perfect valve-movement—in other words, to secure an almost absolutely equal alternate pressure behind the piston-head for both in and out strokes throughout the whole range of cut-offs and to deliver to the crank-pin an equal rotative force at all corresponding points on both the in and out strokes.

More specifically, with this improved mechanism, we obtain: (*a*) a remarkably prompt and wide port-opening; (*b*) a long stationary point at extreme throw of valve; (*c*) a prompt cut-off without wire-drawing; (*d*) a retarded movement of the valve immediately after cut-off, delaying the release and affording a long period of expansion; (*e*) a prompt and full exhaust-opening prolonged by the stationary point of valve and by its retarded movement nearly up to point of closure, thus avoiding back-pressure and reducing compression; (*f*) a correspondingly late and small lead-opening in full gear without reducing the port-opening at short cut-offs.

To these ends our invention consists of the construction or constructions disclosed in the following description and claims.

Though of general application to all kinds of engines, our invention is especially well adapted for use on locomotives, and it is shown in the drawings as so applied.

Like notations referring to like parts throughout, Figure I is a view, partly in side elevation and partly in section, of part of a locomotive embodying our invention. Fig. II is a front view of a portion of our mechanism looking from in front of the driver. Fig. III is a view, partly in side elevation and partly in section, of the carriers and carrier-guides in position. Figs. IV and V are detail views in elevation and section, showing extended arm of the eccentric-strap, the reverse-shaft and guide, and the anti-friction roller movable in the guide. Figs. VI and VII are diagrams illustrating the action of the mechanism.

Referring to Figs. I, II, III, IV, and V, 1 is the main driving-axle. 2 is part of one of the driving-wheels; 3, one of the forward truck-wheels; 4, part of the forward truck; 5, one of the cylinders; 6, the steam-chest; 7, the valve; 8, part of the main frame on right side of engine; 9, part of main frame on opposite side.

10 is a crank-pin; 11, connecting-rod; 12, the cross-head guides.

13 is an eccentric on the driving-axle in line, as shown, with the crank.

14 is an eccentric-strap provided with an extended arm 15.

16 are the reverse-shaft carriers boxed on the axle adjacent to the eccentric 17 is the reverse-shaft, supported at its opposite ends in the carriers 16 and extending through the same outward toward the arms of eccentric-straps.

18 is a lever rigidly secured to the shaft 17 for reversing the same, the connection to the cab not being shown.

19 is one of the guides rigidly attached to the outer end of the reverse-shaft.

20 is an anti-friction roller working in said guide on a rigid pivot-pin 21, projecting inwardly from the extended arm 15 of eccentric-strap 14.

22 is the valve-stem.

23 is the offset point at which the eccentric-rod is attached to the extended arm of eccentric-strap.

24 is a rock-shaft mounted on the main frame and provided with the arms 25 and 26.

27 is the eccentric-rod.

The arms 25 and 26 are so attached to the rock-shaft that when the valve is in mid-position the valve-operating arm 25 is at right angles to the valve-stem and the other arm 26 stands about at right angles to the eccentric-rod. The offset point of connection 23, as shown in the drawings, is below the pivot-pin 21; but the eccentric-strap arm 15 might be extended and the valve-rod be connected directly at some point above the pivot-pin, the rock-shaft then being dispensed with.

The fact that the eccentric-rod is attached to a point offset from the center line of motion of the eccentric-strap arm instead of exactly in the center line, as has hitherto been the practice, is of primary importance. Some of the principal functions of this offset connection are illustrated in Fig. VII and are hereinafter fully set forth. The carriers 16 are provided with vertical slots 28, provided with rollers 28½, which are engaged by guide-pins 29, projecting from a horizontal bar 30, attached to the frame on both sides. With reference to a vertical line these guide-pins are set at an angle, which is determined by the length and position of the eccentric-rods. The bar 30 might be rigidly attached to the carriers 16 and have its ends work in guides attached to the frame, preferably segmental in form. In other words, the construction may be so arranged that the guide may be applied directly to the carriers, or the carriers may be rigidly attached to a bar or bars moving in guides attached to some part of the frame or boiler.

The reverse-shaft 17 serves as the point of suspension in this gear. As this is mounted on the axle and effects the movement of the offset point on the eccentric-strap arm where eccentric-rod is attached, the distance between the offset point and the rock-shaft 24, which is boxed on the frame, would be constantly varied by the rising and falling of the axle (with reference to the frame) on account of the unevenness of the track. To prevent the distance from being varied in this way is the principal function of these carrier-guides, which are so arranged that they not only keep the carriers in an upright position, but move them forward and backward a sufficient distance to prevent the distortion of the valve movement which would otherwise arise from the rising and falling of the axle. This is clearly shown in Fig. VI. In this figure, A is the center of the axle in its lowest position. C is the point of suspension. A C is the center line of motion of eccentric-strap. D is a portion of eccentric-rod. E E' are the points where eccentric-rod may be attached to eccentric-strap arm, and are also points on the arcs F G and F' G' respectively described by back end of eccentric-rod when the front end is pivoted to rocker-arm in its normal position.

When A rises to A', C must rise to C' on the arc J J, in order that E and E' may be moved to E" and E'" on their own arcs F G and F' G', respectively, thus maintaining constantly the same distance between the point where eccentric-rod is attached to eccentric-strap and the rocker-arm. These carriers with automatic guides are intended to permit the gear to be mounted on and actuated by the main axle, and can be dispensed with when the gear is attached to the main frame and actuated directly by the cross-head or indirectly from the main axle.

Turning now to the principal feature of our invention, in all former constructions it was deemed of the utmost importance that the eccentric-rod should be attached to the eccentric-strap arm exactly in the center line of its motion, viz: in a line drawn through the center of the eccentric and the center of the pivot-pin connecting the outer end of the eccentric-arm to the guide-block. Our invention is a departure from this practice in that we make the connection at a point offset from this center line of motion. The position and distance of this offset point of eccentric-rod connection will be determined not only by the dimensions of the other co-operative parts of the gear, but also by the results which it is desired to produce. Fig. VII is intended to show some of the principal features of this offset point of connection in comparison with a connection made to a point exactly in the center line of motion of eccentric-strap arm, as in former constructions. Referring to this diagram, No. 1 is the curve which would be made if the point of connection was made in center line of motion exactly between center of eccentric and pivot-pin of guide roller or block. No. 2 is the curve actually made by the same point when offset from this line.

H is the eccentric, and is represented in line with the crank-pin. When the crank-pin is on the back center, L represents the eccentric at the point of lead, and L' represents the corresponding position when the crank-pin is on the forward center.

Y, Y', Y", Y'", Y"", and Y""' represent the center line of motion of the eccentric-strap arm in different positions.

M M is the center line of the guide on reverse-shaft for the roller or slide block, in which the arm of eccentric-strap is pivoted.

K is the point of suspension or center of reverse-shaft.

N is the point where the eccentric-strap arm is pivoted.

P is the point in center line of motion of eccentric-strap, where, according to the old construction, eccentric-rod would be attached.

O is the new offset point of attachment.

It will be noticed that when the eccentric is at L or L', or the points of lead, N is directly over K and the corresponding relative positions of the old and new points of attachment are represented at P and O and P' and O', respectively.

R represents a portion of the eccentric-rod when attached directly in the center lines of motion at P', and R' is a portion of the same rod when attached at O', the offset point.

The construction shown in Fig. VII is identical with that in Fig. I, and the eccentric-rod may be considered either as one piece connected to the eccentric-strap arm at a point offset from the center line of its motion, as clearly shown in both figures, or, as more clearly appears in Fig. VII, the connection from the center line of motion of the eccentric-strap arm to the valve may be considered as two pieces pivotally connected at the point O'. These two pieces having the movement of a toggle-lever, their extremes will at different portions of the stroke be at different distances apart, and thus adapted to automatically vary the movement imparted by the eccentric-rod at different portions of the stroke. For convenience our improvement is referred to in the following discussion according to the former view—viz., as an offset point of connection for the eccentric-rod.

On a comparison of the curves made by the old and the new point of connection it will be easily seen that the orbit described by the new point of connection is much greater than that of the old point, and hence it must impart more movement to the valve in any given position of the co-operative parts of the gear.

The difference in the movement of the valve resulting from the two different ways of connecting the eccentric-rod to the arm of eccentric-strap can be shown at any given point of action. For example, when the eccentric is at the point of lead L', the corresponding point on curve No. 2 is O'; but this is at some distance above a line drawn directly from P' (the corresponding point of lead in curve No. 1) to the rocker-arm. When L is reached, O, the point corresponding to L on curve No. 2, is below this direct line to the rocker-arm. When passing these points the difference in the movement of the valve is equivalent to the difference of the effect produced by the varying length of the eccentric-rod from the center line of motion, which in one case is the line passing from P' through O' to the rocker-arm, or two sides of a triangle, and the length of the other side—viz., a line drawn directly from P' to the rocker-arm. This produces at certain points an accelerated and greater movement and at other points a retarded and smaller movement. For example, this accelerated and greater movement takes place immediately after leaving O', or point of lead, and thus gives the prompt and wide port-opening we claim, and of course on the opposite side a quick and wide exhaust-opening. This movement prevails until the points of attachment would come directly in line, which, at the inclination of the guide shown, (representing cut-offs as taking place at about O'' and O''' on curve No. 2 and at P'' and P''' on curve No. 1,) would occur somewhere between O'' and O''''' on curve No. 2 and between P'' and P''''' on curve No. 1. Then the movement is reversed as the point approaches the position O, or the opposite point of lead, thus, as claimed, retarding the movement of the valve during the period of expansion, and also delaying the preadmission and reducing the lead-opening. After the valve has reached its extreme throw it pauses or reaches a point of rest on account of the fact that the guide is then causing the outer end of the arm of eccentric-strap to move in a direction opposite to that in which the eccentric is traveling. This arrest of the movement of the valve is compensated by the succeeding quicker movement increased as heretofore explained. This results in a quick closure of the port at point of cut-off, thereby avoiding wire-drawing.

By reference to Fig. VII the above set-forth cause of the stationary point may be clearly seen. For example, if the port be fully opened at O'''', the eccentric center will then be at L'''' and its further travel will be toward L''', while the end of the eccentric-strap will be moving from N''' toward N'' in the opposite direction. These movements neutralize each other, and for a time cease to give any movement to the valve. This period of rest is prolonged when the eccentric-rod is connected at the offset point, which assists the influence of the guide to more nearly counterbalance the movement of the eccentric.

A comparison of the result of attaching the eccentric-rod to an offset point on the eccentric-strap instead of to a point in the center line of motion shows that the former possesses, among others, the following advantage over the old, as has been already explained in detail, viz: (a) It permits a reduction of the lead in full gear fifty per cent. without reducing port-opening in short notches; (b) reduces angle of guide for end of eccentric-strap at any given cut-off ten degrees, thus largely reducing friction; (c) increases period of expansion with same lap; (d) produces longer stationary point or period of rest of valve at extreme throw; (e) secures uniform port-openings for both in and out strokes, old method causing a variation at some points of one-fourth inch. In other words, it secures a more equal and effective distribution of the steam. To trace the effect of this offset point of attachment of the eccentric-rod in overcoming the obliquity of the connecting-rod throughout the whole range of cut-offs, and thus producing the desired distribution of steam, would require elaborate diagrams and an abstruse mathematical discussion, which is not deemed essential in this specification. The use of a roller instead of a flat block in the guides 19 for carrying the outer end of the eccentric-strap arm greatly reduces the friction. The pivot-pin, instead of being loose in the arm, is rigid therewith and works loosely in the roller.

It should be noted that we may, as hereinbefore indicated, dispense with the carriers and their guides, as herein shown, and mount the reverse-shaft on the main frame, deriving the motion direction directly from the cross-head or indirectly from the driving-axle or cross-head.

What we claim, and desire to secure by Letters Patent, is as follows:

1. In a valve-gear, the combination, with an eccentric or crank, of a rigid arm actuated by the eccentric or crank, a guide for said arm constraining it to move in a definite path, and a rod for driving the valve attached to said arm at a point offset from the center line of the arm's motion, substantially as described.

2. In a valve-gear, the combination, with an eccentric or crank, of a rigid arm actuated by the eccentric or crank, a pivoted guide for said arm constraining it to move in a definite path variable at will, and a rod for driving the valve attached to said arm at a point offset from the center line of the arm's motion, substantially as described.

3. In locomotives, the combination, with the driving-axle and its eccentric, of a carrier boxed on the axle, a guide pivotally mounted on said carrier, an eccentric-strap having an extended arm pivotally mounted in said guide, and a rod for driving the valve attached to said arm at a point offset from the center line of the arm's motion, substantially as described.

4. In a valve-gear, the combination, with an eccentric or crank, of a rigid arm actuated by the eccentric or crank, a guide for said arm constraining it to move in a definite path, an eccentric-rod attached at one end to said rigid arm at a point offset from the center line of the arm's motion, and a rock-shaft having a pair of rocker-arms connected, respectively, one to the valve-rod and the other to said eccentric-rod at or about right angles when the valve is in mid-position, substantially as described.

5. In a locomotive, an automatically-adjustable support for the point of suspension of a valve-gear, consisting of a carrier boxed on the driving-axle and a fixed guide for the carrier rigidly secured to the main frame, of such form as to constrain the point of suspension to move approximately on the arc of a circle when the axle rises and falls with reference to the frame, substantially as described.

6. In a locomotive, an automatically-adjustable support for the point of suspension of a valve-gear, consisting of a carrier boxed on the driving-axle, a fixed guide for the carrier rigidly secured to the main frame, and anti-friction rollers between their bearing-surfaces, the said guide being of such form as to constrain the point of suspension to move approximately on the arc of a circle when the axle rises or falls with reference to the frame, substantially as described.

7. In a locomotive, an automatically-adjustable support for the point of suspension of a valve-gear, consisting of a carrier boxed on the driving-axle having a vertical slot, and anti-friction rollers on the opposite sides of the slot, and a guide-pin fixed to the main frame at an oblique angle to the vertical plane and working in said slot against said rollers, substantially as described.

8. In a locomotive, an automatically-adjustable support for the point of suspension of a valve-gear, consisting of a carrier boxed on the main driving-axle and provided with a vertical slot, and a guide-pin fixed to the main frame at an oblique angle to the vertical plane and working in said slot, substantially as described.

9. In a locomotive, the combination, with the driving-axle, of an eccentric thereon, an eccentric-strap having an extended arm, a carrier boxed on the axle, a guide for the outer end of said arm pivotally mounted in said carrier, a rod for driving the valve attached to said arm at a point offset from the center line of its motion, and a fixed guide for said carrier rigidly secured to the main frame, of such form as to constrain the point of suspension to move approximately on the arc of a circle when the axle rises and falls, substantially as described.

10. In a valve-gear, the combination, with an eccentric or crank, of a pivoted guide, a roller movable in said guide, a rigid arm actuated by the eccentric or crank and having a rigid pivot-pin loosely mounted in said roller, and a rod for driving the valve attached to said arm at a point offset from the center line of motion, substantially as described.

11. In a locomotive, the combination, with the driving-axle and its eccentric, of a carrier boxed on the axle, a guide pivotally mounted on said carrier, a roller movable in said guide, an eccentric-strap having an extended arm pivotally mounted in said roller, a fixed guide for said carrier rigidly attached to the main frame at an oblique angle to the vertical plane, an eccentric-rod attached to said eccentric-arm at a point offset from the center line of its motion, and a rocker-arm on the main frame having a pair of rocker-arms connected, respectively, one to the valve-rod and the other to said eccentric-rod at or about at right angles when the valve is in mid-position, substantially as described.

ELLIS J. WOOLF.
JOHN PEEBLES.

In presence of—
THOMAS PEEBLES,
JAS. F. WILLIAMSON.